June 29, 1943.  H. L. WARREN  2,323,262
MATERIAL SPREADER ATTACHMENT
Filed July 8, 1941  2 Sheets-Sheet 1
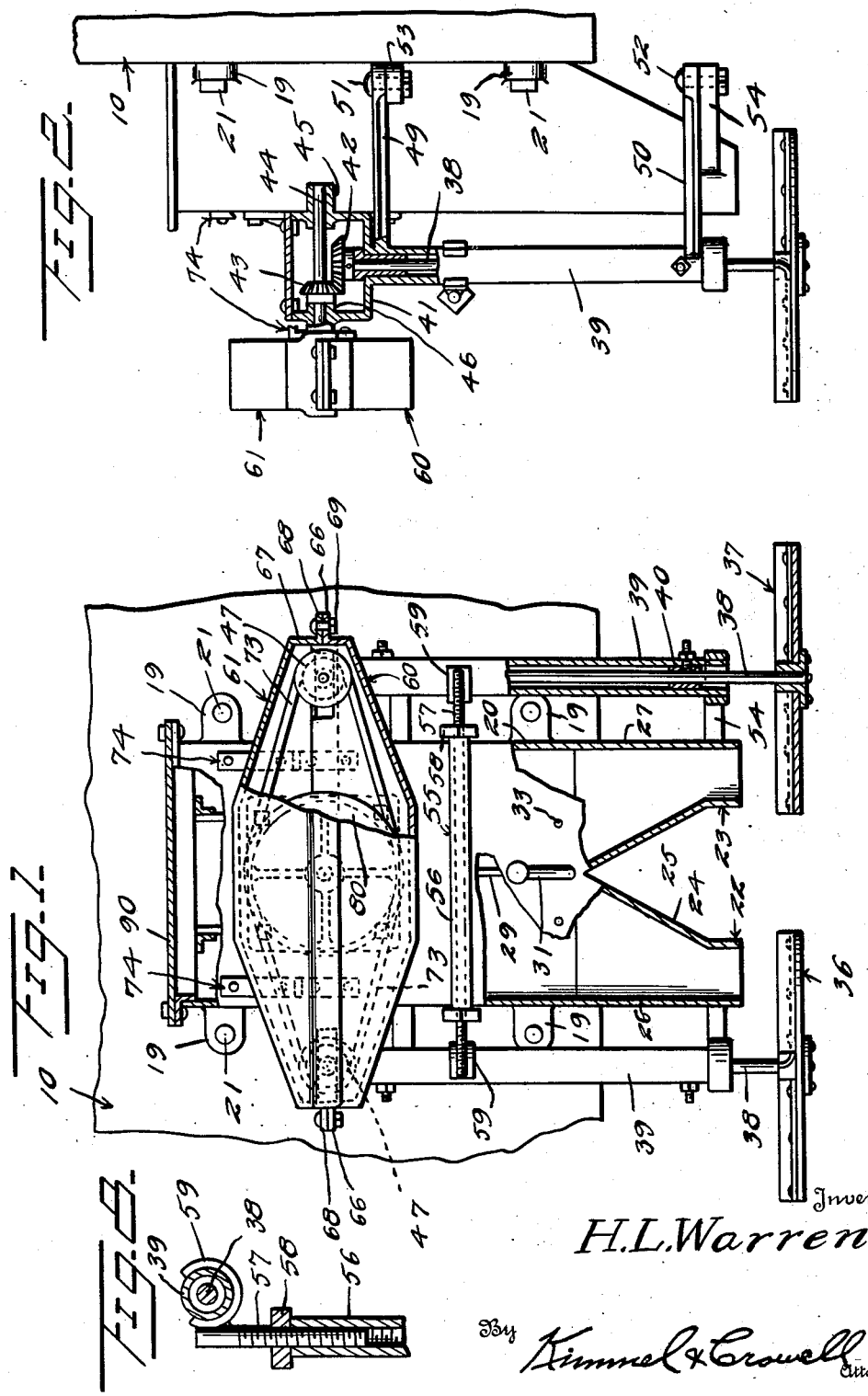
Inventor
H. L. Warren
By Kimmel & Crowell
Attorneys

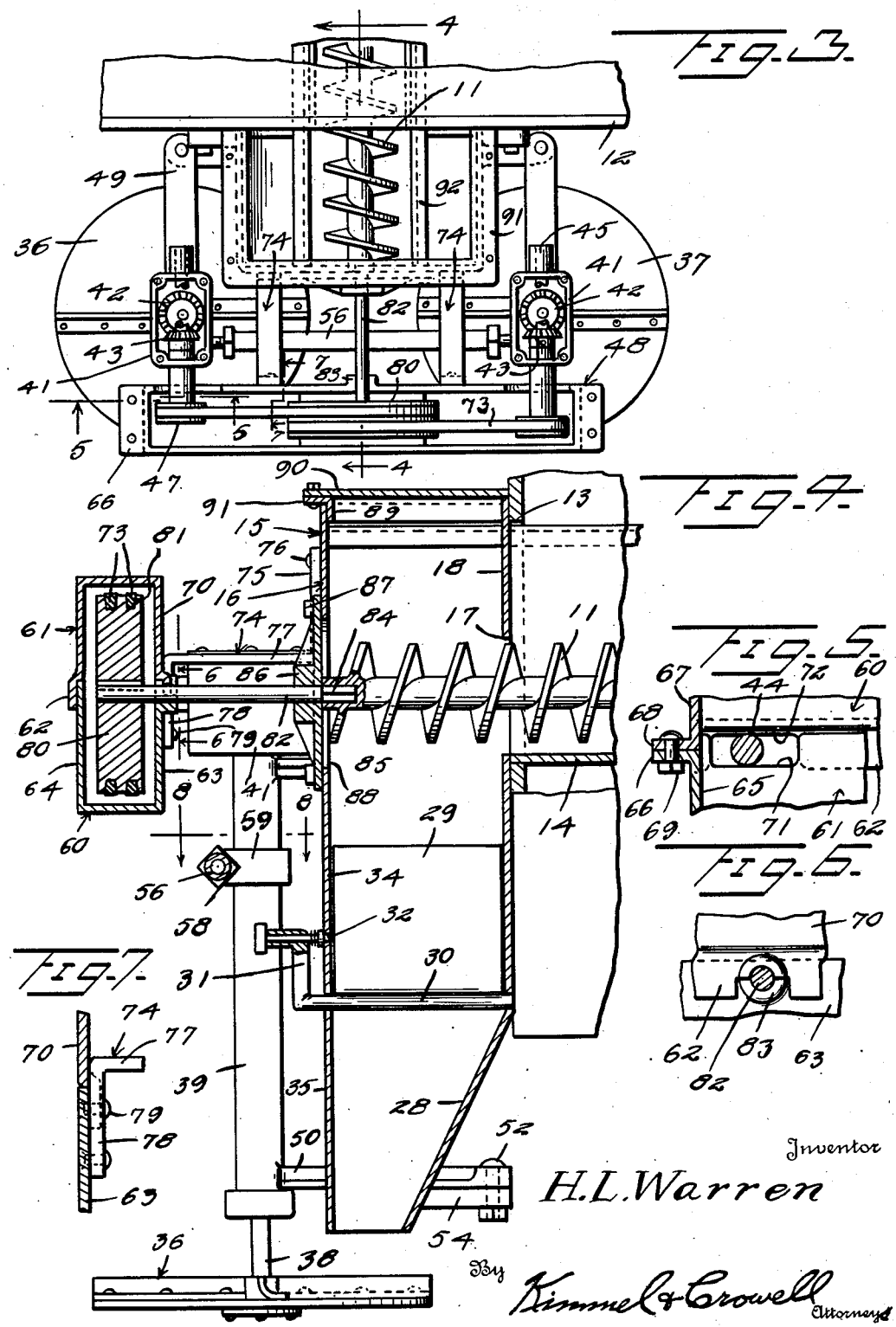

Patented June 29, 1943

2,323,262

UNITED STATES PATENT OFFICE 2,323,262

MATERIAL SPREADER ATTACHMENT

Harry L. Warren, Kinmundy, Ill.

Application July 8, 1941, Serial No. 401,511

12 Claims. (Cl. 275—8)

This invention relates to material spreaders or broadcasting devices, and more particularly to a spreader attachment for a hopper.

An object of this invention is to provide a material spreader attachment which is adapted to be connected with and operated from the screw conveyor carried by the hopper.

Another object of this invention is to provide an attachment of this kind which is adapted to spread the material in opposite directions and which includes means whereby the material may selectively be spread in only one direction.

A further object of this invention is to provide in a device of this kind a pair of spreader members and a swingable supporting structure therefor so that the spreader members may be driven by belts or the like and the belts maintained in a taut condition.

A further object of this invention is to provide in a spreader of this kind means whereby the material may be directed or broadcast in a selected direction.

To the above objects and to others which may hereinafter appear, the invention consists of the novel construction, combination and arrangement of parts as will be more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a detail rear elevation partly broken away in vertical section of a spreader unit, constructed according to an embodiment of this invention mounted on the rear of a hopper, Figure 2 is a detail side elevation partly broken away and in section of the device, Figure 3 is a detail top plan of the device with the several covers removed therefrom, Figure 4 is a vertical section taken on line 4—4 of Figure 3, Figure 5 is a fragmentary sectional view taken on the line 5—5 of Figure 3, Figure 6 is a fragmentary sectional view taken on the line 6—6 of Figure 4, Figure 7 is a fragmentary sectional view taken on the line 7--7 of Figure 3, and Figure 8 is a fragmentary sectional view taken on the line 8—8 of Figure 4.

Referring to the drawings, numeral 10 designates generally a hopper which is adapted to be mounted on a truck body or other mobile structure and which has rotatably mounted in the lower portion thereof a screw conveyor 11. The conveyor 11 extends rearwardly beyond the rear wall or gate 12 so as to force the material, such as lime, fertilizer, or other ground, crushed or granular material, outwardly through an opening 13 which is formed in the end wall or gate 12 and in which a substantially U-shaped trough 14 engages. The trough 14 extends substantially the full length of the hopper 10 and the conveyor 11 is mounted in the lower portion of the trough 14.

In order to provide a means whereby the material, which is moved rearwardly by the conveyor 11, may be spread or broadcast in a selected direction rearwardly of the hopper 10, I have provided a spreader attachment generally designated as 15 which is adapted to be removably secured to the rear of the hopper structure 10. The spreader attachment 15 comprises a substantially rectangular and vertically disposed receiver 16 which is provided with an opening 17 in the front wall 18 thereof. The receiver 16 is provided with a pair of laterally projecting ears 19 extending from each side wall 20 thereof which are adapted to be secured by fastening devices 21 to the end wall 12 of the hopper 10. The receiver 16 is provided in the lower portion thereof with a pair of spaced apart material guiding nozzles 22 and 23 which are each formed with upwardly and inwardly inclined side walls 24 and 25, respectively, and with outer side walls 26 and 27, respectively, which are formed as continuations of the opposite side walls 20 of the receiver 16.

Each spout or discharge member 22 is also provided with a downwardly and rearwardly inclined front wall 28 as shown in Figure 4 so that the material from the receiver 16 will be guided downwardly and rearwardly from the hopper structure 10. A manually shiftable valve or partition member 29 which is mounted on a shaft 30 is disposed at the apex of the upwardly inclined walls 24 and 25 and projects upwardly into the lower portion of the receiver 16. This valve member or partition 29 may be held in a vertically disposed position, which is the position which in Figures 2 and 4, by means of a bell crank 31 which is fixed to or formed integral with the shaft 30. A spring-pressed latching member 32 is carried by the bell crank 31 and is adapted to selectively engage in a plurality of radially arranged recesses 33 which may be formed in the rear wall 34 of the receiver 16.

In this manner the valve member 29 may be disposed in either a vertical position or in a position to cut off the flow of material through either one of the discharge members 22 or 23. The rear wall 35 of each of the spouts or discharge members 22 or 23 may be formed as a continuation of the rear wall 34 of the receiver 16.

A pair of centrifugal material spreader members 36 and 37 are disposed below the discharge members 22 and 23, respectively, and each of the spreader members 36 and 37 is fixedly mounted on a vertically disposed shaft 38. The mounting means for each spreader member is identical and the description of one of these members will apply equally as well to the other member.

The shaft 38 is rotatably mounted in a vertically disposed housing 39 having one or more bearings or bushings 40 disposed therein and the upper end portion of the housing 39 is fixed to a gear housing 41. The upper end portion of the shaft 38 has fixed thereto a bevelled gear 42 which is adapted to mesh with a bevelled gear 43 carried by a stub shaft 44. The stub shaft 44 is mounted in bearings 45 and 46 carried by the housing 41 and the rear end of the stub shaft 44 has mounted thereon a grooved pulley 47 which is mounted in a separable pulley housing generally designated as 48. The shaft housing 39 has fixedly secured thereto or formed integral therewith upper and lower supporting arms 49 and 50, respectively, which extend forwardly and are pivotally mounted on pivot members 51 and 52. The pivot member 51 engages through a laterally projecting supporting ear 53 carried by the adjacent side wall 20 of the receiver 16 and the pivot 52 engages through a laterally projecting supporting ear 54 which is carried by the lower portion of the spout wall 27. The two shaft housings 39 are held in the desired spaced apart relation by means of a spacer, generally designated as 55.

The spacer 55 includes a tubular member 56 which has threaded into the opposite ends thereof a pair of shafts or rods 57, the rods 57 being oppositely pitched one from the other after the manner of a turn buckle so that rotation of the tubular member 56 in one direction will draw the two housings 39 together, and rotation of the tubular member 56 in the other direction will move the housing members 39 away from each other. The threaded rods 57 may be locked against movement relative to the tubular member 56 by lock nuts 58 which are threaded onto the rods 57 and bear against the adjacent ends of the tubular member 56. The outer ends of the threaded members 57 each have secured thereto a part circular band or ring 59 which engages about a housing 39 so that movement of the rods 57 in either direction will forcibly amove the housing members 39 therewith.

The pulley housing 48 includes a lower housing member 60 and an upper housing member 61 which is formed with outwardly offset, lower portions 62 telescoping over the front and rear walls 63 and 64 of the lower housing member 60. The opposite end walls 65 of the lower housing member 60 are formed with outwardly projecting flanges 66, and the opposite end walls 67 of the upper housing member 61 are formed with outwardly projecting flanges 68. The two flanges 66 and 68 are detachably secured together by fastening devices 69.

As shown in Figure 5, the front walls 63 and 70 of the lower and upper housing members 60 and 61, respectively, are formed with notches or slots 71 and 72, respectively, which are horizontally elongated so that the shafts 44 may loosely extend through the walls 63 and 70 and may be horizontally adjusted in order to tighten the belts 73 which engage over the pulleys 47. The pulley housing 48 is supported in rearwardly spaced relation with respect to the receiver 16 by means of a pair of bracket members 74. The bracket members 74 include a vertically disposed arm 75 which may be secured by fastening devices 76 to the rear wall 34 of the receiver 16, and also include a horizontally disposed arm 77 extending rearwardly from the rear wall 34 and terminating in a depending vertical arm 78 which is adapted to be secured by fastening devices 79 to the front wall 63 of the lower housing member 60.

A driving pulley 80 is disposed within the pulley housing 48 and is provided with a pair of V-shaped grooves 81 within which the two belts 73 engage. The two grooves are in spaced apart relation as shown in Figure 4 and the opposite shaft operating pulleys 44 are adapted to rotate in opposite directions. The driving pulley 80 is mounted on a stub shaft 82 which is journalled in bearings 83 carried by the front wall 63 of the lower housing member 60, and the front end portion of the stub shaft 82 is formed with a splined or squared end 84 which is adapted to engage in a socket 85 formed in the rear end of the conveyor member 11. The stub shaft 82 is journalled through a bearing plate 86 which is fixed by fastening devices 87 to the rear wall 34 of the receiver 16. The rear wall 34 of the receiver 16 may be formed with an opening 88 confronting the rear end of the conveyor 11 so that if desired, the plate 86 may be removed from the receiver 16 and the conveyor 11 withdrawn through the opening 88.

The upper end portion of the receiver 16 has secured thereto angle members 89 and a lid or cover 90 may be secured to the upper horizontal flanges 91 of the angle members 89 so as to close the upper end of the receiver 16. The receiver 16 may also be provided adjacent the upper portion thereof with a pair of angle-shaped parallel bracing members 92 which are secured between the front and rear walls 18 and 34, respectively, as shown in Figure 3.

What I claim is:

1. A spreader attachment for a hopper provided with a conveyor for moving the material endwise of the hopper; said attachment comprising a housing having an intake opening, means detachably mounting said housing on an end of said hopper whereby the conveyor will discharge material through said intake opening, a pair of delivery spouts extending downwardly from said housing, a centrifugal spreader beneath each spout, means rotating said spreaders, means for laterally adjusting said spreaders, and a valve in said housing adjacent the upper ends of said spouts for regulating the discharge of material into a selected one or both of said spouts.

2. A spreader attachment for a hopper provided with a conveyor for moving the material endwise of the hopper; said attachment comprising a housing having an intake opening, means detachably mounting said housing on an end of said hopper whereby the conveyor will discharge material through said intake opening, a pair of delivery spouts extending downwardly from said housing, a centrifugal spreader beneath each spout, means rotating said spreaders, means for laterally adjusting said spreaders, means detachably coupling said spreader rotating means with said conveyor, and a valve in said housing adjacent the upper ends of said spouts for regulating the discharge of material into a selected one or both of said spouts.

3. A spreader attachment for a hopper provided with a conveyor for moving the material endwise of the hopper; said attachment comprising a housing having an intake opening, means detachably mounting said housing on an end of said hopper whereby the conveyor will discharge material through said intake opening, a pair of delivery spouts extending downwardly from said housing, a pair of vertically disposed shaft housings positioned on opposite sides of said first housing, means swingably mounting said shaft housings on said first housing, a vertically disposed spreader shaft in each shaft housing, a centrifugal spreader carried by the lower end of each shaft, a horizontal stub shaft disposed adjacent the upper end of each vertical shaft, intermeshing gears carried by said vertical and stub shafts, a pulley housing disposed in rearwardly spaced relation with respect to said first housing, means supporting said pulley housing from said first housing, a driving pulley in said pulley housing, a driven pulley carried by each stub shaft and disposed in said pulley housing, a pair of oppositely extending belts engaging said driving and driven pulleys, means engaging between said shaft housings for maintaining said belts taut, a driving stub shaft fixed to said driving pulley and extending forwardly into said first housing, and correlated coupling means carried by said driving stub shaft and said conveyor.

4. A spreader attachment for a hopper provided with a conveyor for moving the material endwise of the hopper; said attachment comprising a housing having an intake opening, means detachably mounting said housing on an end of said hopper whereby the conveyor will discharge material through said intake opening, a pair of delivery spouts extending downwardly from said housing, a pair of vertically disposed shaft housings positioned on opposite sides of said first housing, means swingably mounting said shaft housings on said first housing, a vertically disposed spreader shaft in each shaft housing, a centrifugal spreader carried by the lower end of each shaft, a horizontal stub shaft disposed adjacent the upper end of each vertical shaft, a gear housing at the upper end of each shaft housing, intermeshing gears carried by said vertical and stub shafts and disposed in said gear housing, a pulley housing disposed in rearwardly spaced relation with respect to said first housing, means supporting said pulley housing from said first housing, a driving pulley in said pulley housing, a driven pulley carried by each stub shaft and disposed in said pulley housing, a pair of oppositely extending belts engaging said driving and driven pulleys, means engaging between said shaft housings for maintaining said belts taut, a driving stub shaft fixed to said driving pulley and extending forwardly into said first housing, and correlated coupling means carried by said driving stub shaft and said conveyor.

5. In combination a hopper, a screw conveyor in the lower portion of said hopper and projecting rearwardly of said hopper, a spreader housing having an opening in the front wall thereof whereby the projecting end of said conveyor may engage within said housing, means removably securing said housing on said hopper, a pair of rotatable spreader elements disposed below said housing, means swingably and rotatably mounting said elements on said housing, operating means for said elements, and means detachably connecting said operating means with said conveyor.

6. In combination a hopper, a screw conveyor in the lower portion of said hopper and projecting rearwardly of said hopper, a spreader housing having an opening in the front wall thereof whereby the projecting end of said conveyor may engage within said housing, means removably securing said housing on said hopper, a pair of rotatable spreader elements disposed below said housing, means swingably and rotatably mounting said elements on said housing, means adjustably spacing the mounting means for said elements one relative to the other, operating means for said elements, and means detachably connecting said operating means with said conveyor.

7. In combination a hopper, a screw conveyor in the lower portion of said hopper and projecting rearwardly of said hopper, a spreader housing having an opening in the front wall thereof whereby the projecting end of said conveyor may engage within said housing, means removably securing said housing on said hopper, a pair of rotatable spreader elements disposed below said housing, means swingably and rotatably mounting said elements on said housing, operating means for said elements, means detachably connecting said operating means with said conveyor, and manually operable means within said housing for directing the material onto a selected one or both of said elements.

8. An attachment for a hopper including a material spreader, a screw conveyor carried by the hopper, means for laterally adjusting said spreader, said spreader adapted to be connected with and operated from said screw conveyor and manually operable means for directing the material in the hopper in one or more directions.

9. In combination with a mobile structure having a rear wall, an end wall, a hopper, a screw conveyor mounted in the lower portion of said hopper, said conveyor extending rearwardly beyond said rear wall so as to force the material outwardly through an opening formed in the end wall, a trough engaging in said opening, said conveyor being mounted in the lower portion of the trough, a spreader attachment removably secured to the rear of the hopper structure and means for laterally adjusting said spreader attachment.

10. In combination with a mobile structure having a rear wall, an end wall, a hopper, a screw conveyor mounted in the lower portion of said hopper, said conveyor extending rearwardly beyond said rear wall so as to force the material outwardly through an opening formed in the end wall, a trough engaging in said opening, said conveyor being mounted in the lower portion of the trough, a spreader attachment removably secured to the rear of the hopper structure, said spreader attachment comprising a receiver having an opening in the front wall thereof and means for laterally adjusting said attachment.

11. In combination with a mobile structure having a rear wall, an end wall, a hopper, a screw conveyor mounted in the lower portion of said hopper, said conveyor extending rearwardly beyond the said rear wall so as to force the material outwardly through an opening formed in the end wall, a trough engaging in said opening, said conveyor being mounted in the lower portion of the trough, a spreader attachment removably secured to the rear of the hopper structure, said spreader attachment comprising a receiver having an opening in the front wall thereof, and a pair of spaced apart material guiding nozzles provided with downwardly and rearwardly inclined front walls so that the material from the receiver will be guided downwardly and rearwardly from the hopper and means for laterally adjusting said spreader elements.

12. In combination, a hopper, a screw conveyor, a spreader housing having an opening in one wall thereof whereby an end of said conveyor may engage within said housing, means removably securing said housing on said hopper, spreader elements, operating means for said elements, means for laterally adjusting said spreader elements and means connecting said operating means with said conveyor.

HARRY L. WARREN.